United States Patent
Shahana (10) Patent No.: US 10,981,629 B2
(45) Date of Patent: Apr. 20, 2021

(54) GEAR SHIFT CONTROLLER AND GEAR SHIFTING SYSTEM

(71) Applicant: Shimano Inc., Osaka (JP)

(72) Inventor: Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 16/692,788

(22) Filed: Nov. 22, 2019

(65) Prior Publication Data

US 2020/0207444 A1 Jul. 2, 2020

(30) Foreign Application Priority Data

Dec. 27, 2018 (JP) ............................. JP2018-246225

(51) Int. Cl.
*B62M 25/08* (2006.01)
*B62M 9/123* (2010.01)
*B62M 9/122* (2010.01)

(52) U.S. Cl.
CPC ............ *B62M 25/08* (2013.01); *B62M 9/122* (2013.01); *B62M 9/123* (2013.01)

(58) Field of Classification Search
CPC ...... B62M 25/08; B62M 9/122; B62M 9/123; B62M 9/132; F16H 61/0213; F16H 61/08; F16H 61/10
See application file for complete search history.

(56) References Cited

U.S. PATENT DOCUMENTS

| 2013/0110335 | A1* | 5/2013 | Durdevic | B62M 25/08 701/22 |
|---|---|---|---|---|
| 2016/0207589 | A1* | 7/2016 | Tsuchizawa | B62M 6/55 |
| 2016/0375958 | A1* | 12/2016 | Hashimoto | B62M 9/133 701/58 |
| 2017/0106866 | A1* | 4/2017 | Schieffelin | B62M 25/08 |
| 2018/0111661 | A1* | 4/2018 | Wesling | B62M 25/08 |
| 2019/0315435 | A1* | 10/2019 | Jordan | B62L 3/02 |

FOREIGN PATENT DOCUMENTS

| JP | 3373371 B2 | 2/2003 |
|---|---|---|
| JP | 3522226 B2 | 4/2004 |

* cited by examiner

*Primary Examiner* — Edwin A Young
(74) *Attorney, Agent, or Firm* — Global IP Counselors, LLP (57) ABSTRACT

A gear shift controller includes a detection circuit and a control unit. The detection circuit is configured to determine traveling state information about a traveling state of a human-powered vehicle. The control unit is configured to receive the traveling state information from the detection circuit to control a shift standby time of a transmission of the human-powered vehicle. The traveling state information includes information other than traveling speed information about a traveling speed of the human-powered vehicle and crank information about crank rotation information of the human-powered vehicle.

17 Claims, 6 Drawing Sheets

GEAR SHIFT CONTROLLER AND GEAR SHIFTING SYSTEM

CROSS-REFERENCE TO RELATED APPLICATIONS

This application claims priority to Japanese Patent Application No. 2018-246225, filed on, Dec. 27, 2018. The entire disclosure of Japanese Patent Application No. 2018-246225 is hereby incorporated herein by reference.

BACKGROUND

Technical Field

The present invention generally relates to a controller and a shifting system.

Background Information

Human-powered vehicles are capable of changing the gear ratio of a power transmission mechanism by providing gear shift control to a shifting device having multiple shift stages. In recent years, human-powered vehicles have been proposed that include a controller used to automatically control the shifting device. For example, Japanese Patent No. 3,522,226 discloses a bicycle shift controller that controls the shifting device based on a traveling speed of the bicycle or a rotational speed of a crank.

SUMMARY

There is a demand for a gear shift controller capable of controlling the transmission in a manner more suitable for a traveling state of the human-powered vehicle.

The gear shift controller disclosed in the present disclosure has been made to solve the above problem. One an object presented in this disclosure is to provide a gear shift controller and a shifting system that are capable of reducing ineffective gear shifting and smoothly shifting the gears.

To solve the above-described problem and achieve the object, in accordance with a first aspect of the present disclosure, a gear shift controller includes a detection circuit and a control unit. The detection circuit is configured to determine traveling state information about a traveling state of a human-powered vehicle. The control unit is configured to receive the traveling state information from the detection circuit to control a shift standby time of a transmission of the human-powered vehicle. The traveling state information includes information other than traveling speed information about a traveling speed of the human-powered vehicle and crank information about crank rotation information of the human-powered vehicle.

With the gear shift controller according to the first aspect, the control unit controls a shift standby time of the transmission of the human-powered vehicle based on traveling state information that includes information other than traveling speed information about the traveling speed of the human-powered vehicle and crank information about crank rotation information of the human-powered vehicle. This configuration allows the shift standby time of the transmission to be determined based on the traveling state and therefore allows the transmission to be controlled in a manner more suitable for the traveling state of the human-powered vehicle.

In accordance with a second aspect, in the gear shift controller according to the first aspect, the detection circuit determines, as the traveling state information, at least one of: torque information about torque input to the human-powered vehicle; power information about power input to the human-powered vehicle; tilt-angle information about a tilt angle of a road on which the human-powered vehicle travels; acceleration information about acceleration in a propulsive direction of the human-powered vehicle; and motion information of the human-powered vehicle about at least one of angular velocity, angular acceleration, and an amount of change in a posture position around at least one of a yaw axis, a roll axis, and a pitch axis. The control unit is configured to control the shift standby time based on at least one of the torque information, the power information, the tilt-angle information, the acceleration information and the motion information that is received from the detection circuit.

With the gear shift controller according to the second aspect, the shift standby time of the transmission is determined based on at least one of information pieces of torque information, power information, tilt-angle information, acceleration information, and motion information. This configuration allows the transmission to be controlled in a manner more suitable for the traveling state of the human-powered vehicle.

In accordance with a third aspect, in the gear shift controller according to the second aspect, circuit is configured to determine at least the torque information, and the control unit is configured to control the shift standby time based in at least the torque information.

With the gear shift controller according to the third aspect, the shift standby time of the transmission is determined based on at least torque information. This configuration allows the transmission to be controlled in a manner more suitable for the traveling state of the human-powered vehicle.

In accordance with a fourth aspect, in the gear shift controller according to the second or third aspect, the detection circuit is configured to determine at least the power information, and the control unit is configured to control the shift standby time based on at least the power information.

With the gear shift controller according to the fourth aspect, the shift standby time of the transmission is determined based on at least power information. This configuration allows the transmission to be controlled in a manner more suitable for the traveling state of the human-powered vehicle.

In accordance with a fifth aspect, in the gear shift controller according to any one of the second to fourth aspects, the detection circuit is configured to determine at least the acceleration information, and the control unit is configured to control the shift standby time based on at least the acceleration information.

With the gear shift controller according to the fifth aspect, the shift standby time of the transmission is determined based on at least acceleration information. This configuration allows the transmission to be controlled in a manner more suitable for the traveling state of the human-powered vehicle.

In accordance with a sixth aspect, in the gear shift controller according to any one of the second to fifth aspects, the detection circuit is configured to determine at least the tilt-angle information, and the control unit is configured to control the shift standby time based on at least the tilt-angle information.

With the gear shift controller according to the sixth aspect, the shift standby time of the transmission is determined based on at least tilt-angle information. This configuration allows the transmission to be controlled in a manner more suitable for the traveling state of the human-powered vehicle.

In accordance with a seventh aspect, in the gear shift controller according to the sixth aspect, the control unit is configured to control the shift standby time based on at least a change in the tilt-angle information.

With the gear shift controller according to the seventh aspect, the shift standby time of the transmission is determined based on at least a change in the tilt-angle information. This configuration allows the transmission to be controlled in a manner more suitable for the traveling state of the human-powered vehicle.

In accordance with an eighth aspect, in the gear shift controller according to any one of the second to the seventh aspects, the detection circuit is configured to determine at least the motion information, and the control unit refers to at least the motion information to control the shift standby time.

With the gear shift controller according to the eighth aspect, the shift standby time of the transmission is determined based on at least the motion information. This configuration allows the transmission to be controlled in a manner more suitable for the traveling state of the human-powered vehicle.

In accordance with a ninth aspect, in the gear shift controller according to any one of the second to eighth aspects, the detection circuit is further configured to determine the crank information, and the control unit is configured to control the shift standby time based on at least the tilt-angle information and the crank information.

With the gear shift controller according to the ninth aspect, the shift standby time of the transmission is determined based on at least the tilt-angle information and the crank information. This configuration allows the transmission to be controlled in a manner more suitable for the traveling state of the human-powered vehicle.

In accordance with a tenth aspect, in the gear shift controller according to the ninth aspect, the control unit is configured to control the shift standby time based on at least the tilt-angle information, the crank information, and the torque information.

With the gear shift controller according to the tenth aspect, the shift standby time of the transmission is determined based on at least the tilt-angle information, the crank information, and the torque information. This configuration allows the transmission to be controlled in a manner more suitable for the traveling state of the human-powered vehicle.

In accordance with an eleventh aspect, in the gear shift controller according to the ninth or tenth aspect, the control unit is configured to control the shift standby time based on at least the tilt-angle information, the crank information, and the power information.

With the gear shift controller according to the eleventh aspect, the shift standby time of the transmission is determined based on at least the tilt-angle information, the crank information, and the power information. This configuration allows the transmission to be controlled in a manner more suitable for the traveling state of the human-powered vehicle.

In accordance with a twelfth aspect, in the gear shift controller according to any one of the second to eleventh aspects, the control unit is configured to a control signal including shift direction information about a shift direction to the transmission, and the control unit is configured to control the shift standby time based on at least one of the torque information, the power information, the tilt-angle information, the acceleration information and the motion information that is received from the detection circuit and the shift direction information.

With the gear shift controller according to the twelfth aspect, the shift standby time of the transmission is determined based on at least a piece of information detected by the detection unit and the shift direction information. This configuration allows the transmission to be controlled in a manner more suitable for the traveling state of the human-powered vehicle.

In accordance with a thirteenth aspect, in the gear shift controller according to any one of the first to twelfth aspects, the control unit is configured to transmit a first control signal to the transmission before the shift standby time has elapsed, and transmits a second control signal to the transmission after the shift standby time has elapsed.

With the gear shift controller according to the thirteenth aspect, when the shift standby time has elapsed, the control unit transmits the second control signal to the transmission. This configuration enables shifting at an appropriate timing based on a set shift standby time. This configuration allows the transmission to be controlled in a manner more suitable for the traveling state of the human-powered vehicle.

In accordance with a fourteenth aspect, a shifting system includes the gear shift controller according to any one of the first to thirteenth aspects; and a shifting device of the transmission.

With the shifting system according to the fourteenth aspect, the shift standby time of the shifting device of the transmission is determined by the gear shift controller based on the traveling state. This configuration allows the shifting device to be controlled in a manner more suitable for the traveling state of the human-powered vehicle.

In accordance with a fifteenth aspect, the shifting system according to the fourteenth aspect further includes a gear shift operating device. The gear shift controller is configured to output a control signal corresponding to an operation input to the gear shift operating device.

With the shifting system according to the fifteenth aspect, the gear shift controller outputs the control signal corresponding to an operation input to the gear shift operating device. This configuration enables shifting at a more proper timing.

According to the present disclosure, it is possible to control a transmission in a manner more suitable for a travel state of the human-powered vehicle.

BRIEF DESCRIPTION OF THE DRAWINGS

Referring now to the attached drawings which form a part of this original disclosure.

DESCRIPTION OF EMBODIMENTS

A preferred embodiment will be described in detail with reference to the accompanying drawings. The present invention is not limited to the illustrated embodiment. In a case that several embodiments are available, the present invention encompasses a configuration including any combination of embodiments. In other words, it will be apparent to those skilled in the human-powered vehicle (e.g., bicycle) field from this disclosure that the following descriptions of the embodiments are provided for illustration only and not for the purpose of limiting the invention as defined by the appended claims and their equivalents.

First Embodiment

Figure 1:
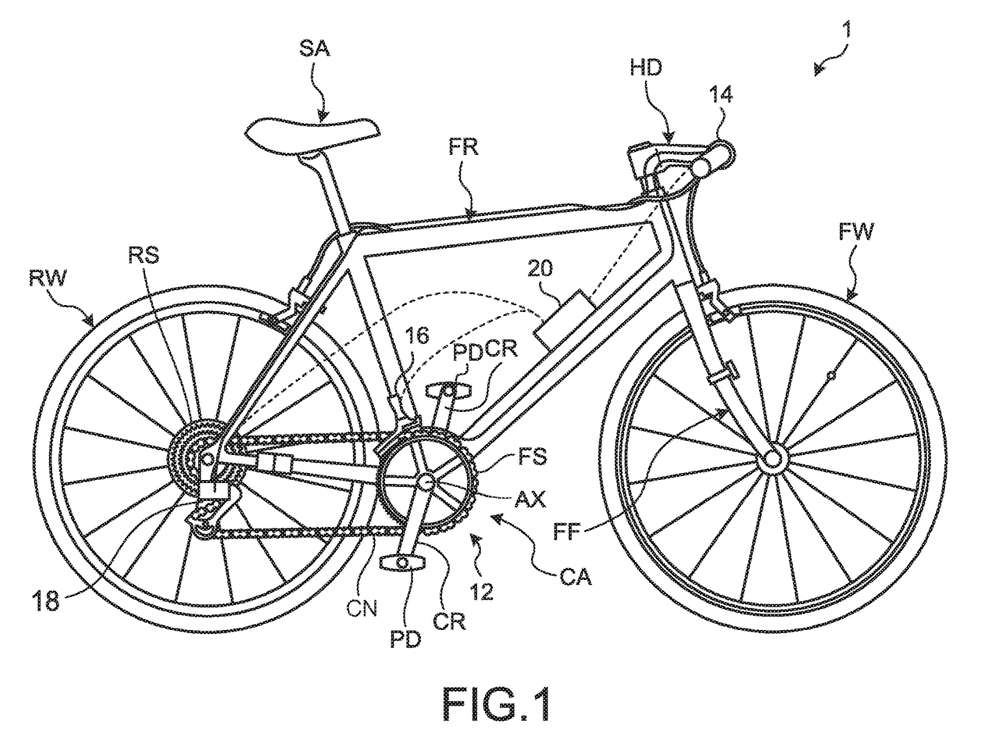
FIG. 1 is a schematic diagram illustrating a configuration of a human-powered vehicle on which a gear shift controller according to a first embodiment is mounted.

As illustrated in FIG. 1, a human-powered vehicle 1 according to an embodiment is a vehicle driven by a person who rides on the human-powered vehicle 1. The human-powered vehicle 1 of the embodiment is a vehicle that at least partially uses human power as a driving power for traveling and includes a vehicle that assists human power by electric power. The human-powered vehicle does not include a vehicle that uses only driving power other than human power. Particularly, the human-powered vehicle does not include a vehicle that uses only an internal combustion as the driving power. In general, the human-powered vehicle is considered as a small and light-weight vehicle and a vehicle that does not require a license on a public road.

The human-powered vehicle 1 is a bicycle driven by using human driving power of a rider. The human-powered vehicle 1 includes a frame FR, a front fork FF, a saddle SA, a handlebar assembly HD, a crank assembly CA, a front sprocket assembly FS, a rear sprocket assembly RS, a chain CN, a front wheel FW, a rear wheel RW, and a shifting system 10.

A crank assembly FC includes a crank axle AX and a pair of crank arms CR connected to respective ends of the crank axle AX. The crank axle AX is rotatably supported by a bottom bracket attached to the frame FR. Each of the crank arms CR is provided with a pedal PD. Each of the pedals PD is rotatably supported by one of the crank arms CR.

The front sprocket assembly FS is connected to the crank assembly FC. The axis of rotation of the front sprocket assembly FS is coaxial with the axis of rotation of the crank axle AX. The front sprocket assembly FS includes one or more front sprockets. In this embodiment, the front sprocket assembly FS includes a plurality of front sprockets having different diameters or numbers of teeth.

The rear sprocket assembly RS is connected to the rear wheel RW in a manner rotatable around the axis of rotation of the rear wheel RW. The rear sprocket assembly RS includes one or more rear sprockets. In this embodiment, the rear sprocket assembly RS includes a plurality of rear sprockets having different diameters or numbers of teeth.

The chain CN is wound around the front sprocket of the front sprocket assembly FS and the rear sprocket of the rear sprocket assembly RS. When the front sprocket assembly FS is rotated forward by the human-power driving force that is applied to the pedal PD by a rider seated on the saddle SA, as the driving force is transmitted via the chain CN and the rear sprocket assembly RS, the rear wheel RW is rotated forward and the human-powered vehicle 1 moves forward.

The shifting system 10 includes a transmission 12 and a gear shift controller 20. The term "gear shift controller" as used herein refers to hardware that executes a software program, and does not include a human. The transmission 12 changes the gear ratio of the human-powered vehicle 1 based on a control signal from the gear shift controller 20. The gear ratio indicates a rotation amount of the rear wheel RW during one turn of the crank arm CR. In this embodiment, the transmission 12 includes a front derailleur 16 and a rear derailleur 18. The front derailleur 16 is an example of a shifting device that changes the gear ratio of the human-powered vehicle 1 by changing the front sprocket around which the chain CN is wound to another one of the front sprocket assembly FS. Likewise, the rear derailleur 18 is an example of a shifting device that changes the gear ratio of the human-powered vehicle 1 by changing the rear sprocket around which the chain CN is wound to another one of the rear sprocket assembly RS.

The shifting system 10 further includes a shift operating device 14. The gear shift controller 20 outputs a control signal corresponding to an operation, input to the shift operating device 14. In this embodiment, the shift operating device 14 is mounted on the handlebar assembly HD. The shift operating device 14 receives an input of gear shift from the rider of the human-powered vehicle 1. In this embodiment, the shift operating device 14 is electrically connected with the gear shift controller 20, and a control signal corresponding to the input operation is transmitted to the gear shift controller 20 in a wired or wireless manner. Basically, the shift operating device 14 is a user operable input device that can include, for example, a button, a switch, a lever, a dial and/or a touch screen that is operated by a rider to output the control signal.

Figure 2:
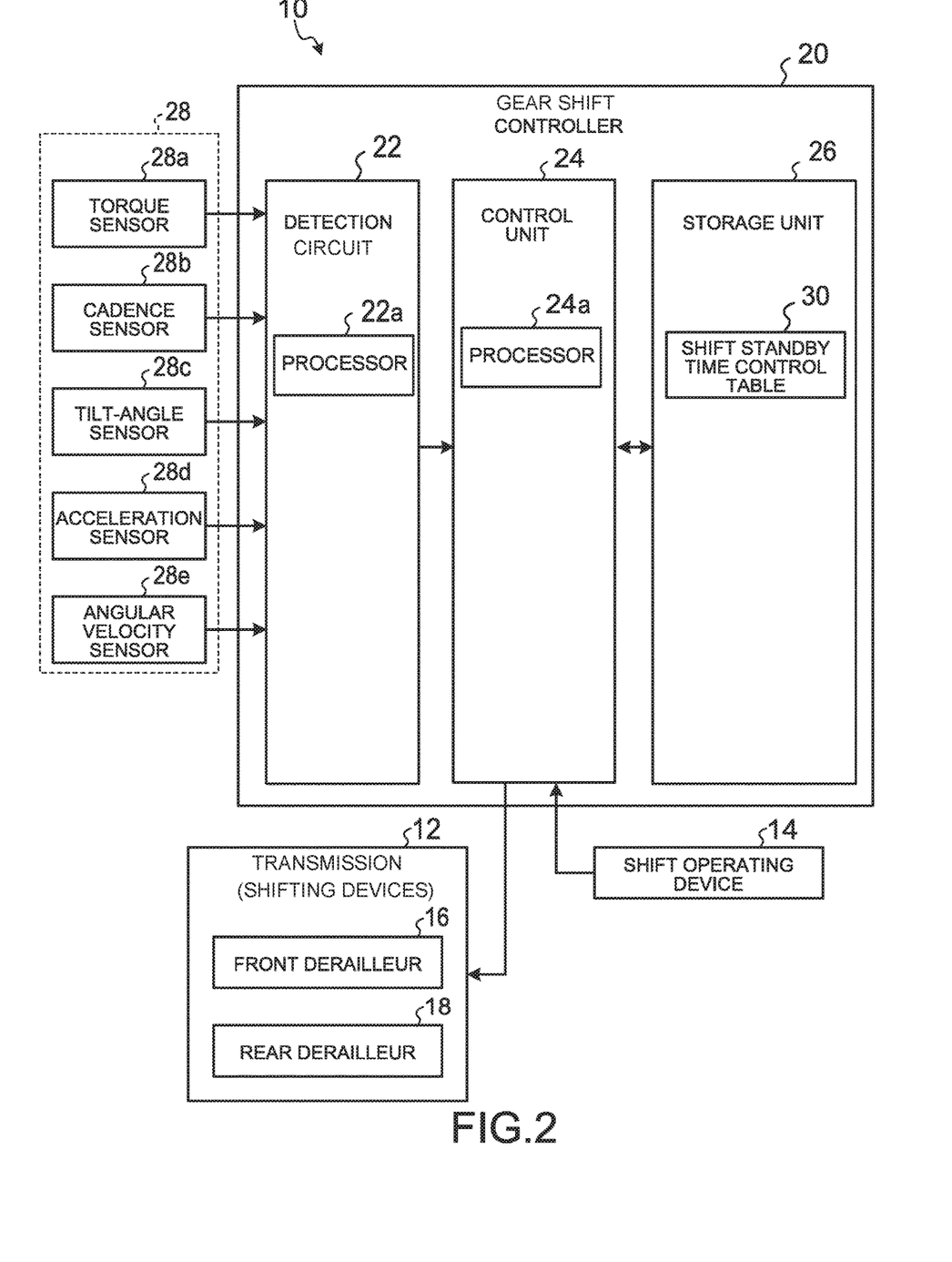
FIG. 2 is a block diagram of a shifting system having the gear shift controller according to the first embodiment.

The gear shift controller 20 includes, as illustrated in FIG. 2, a detection circuit 22 and a control unit 24. The term "control unit" as used herein refers to hardware that executes a software program, and does not include a human. Although the detection circuit 22 and the control unit 24 are illustrated as separate elements, those skill in the art will recognize that one or more components can comprise, or include one or more printed circuit boards (PCB) containing any number of integrated circuit or circuits for completing the activities described herein. The detection circuit 22 and the control unit 24 can be one or more integrated circuits having firmware for causing the circuitry to complete the activities described herein. Of course, any number of other analog and/or digital components capable of performing the below described functionality can be provided in place of, or in conjunction with the below described controller elements. The detection circuit 22 includes a processor 22a that determines a traveling state information about the traveling state of the human-powered vehicle 1. The control unit 24 includes a processor 24a that is configured to control the shift standby time of the transmission 12 of the human-powered vehicle 1 refers to the traveling state information detected by the detection circuit 22. The traveling state information includes information other than traveling speed information about the traveling speed of the human-powered vehicle 1 and crank information about crank rotation information of the human-powered vehicle 1. In this embodiment, the traveling state information includes torque information about torque input to the human-powered vehicle 1, power information about power input to the human-powered vehicle 1, tilt-angle information about the tilt angle of a road on which the human-powered vehicle 1 travels, acceleration information about acceleration in the propulsive direction of the human-powered vehicle 1, and motion information of the human-powered vehicle 1. The motion information includes at least one of angular velocity, angular acceleration, and the amount of change in the posture position around at least one of the yaw axis, the roll axis, and the pitch axis.

The detection circuit 22 determines the traveling state information from the results of detection of a traveling-state sensor 28. In this embodiment, the traveling-state sensor 28 includes a torque sensor 28*a*, a cadence sensor 28*b*, a tilt-angle sensor 28*c*, an acceleration sensor 28*d*, and an angular velocity sensor 28*e*. The processor 22*a* of the detection circuit 22 performs arithmetic processing based the detection results of the torque sensor 28*a*, the cadence sensor 28*b*, the tilt-angle sensor 28*c*, the acceleration sensor 28*d*, and the angular velocity sensor 28*e*.

The torque sensor 28*a* detects torque input to the human-powered vehicle 1. More specifically, the torque sensor 28*a* detects torque applied to the crank arm CR. The torque sensor 28*a* includes a torsion sensor, a magnetostriction sensor, an optical sensor, and other types of sensor. The cadence sensor 28*b* detects cadence of the human-powered vehicle 1. The detection circuit 22 calculates power input to the human-powered vehicle 1 based on torque detected by the torque sensor 28*a* and cadence detected by the cadence sensor 28*b*. The tilt-angle sensor 28*c* detects the tilt angle of a road surface on which the human-powered vehicle 1 travels. The tilt-angle sensor 28*c* includes an atmospheric pressure sensor and a GPS sensor. The detection circuit 22 can calculate the tilt angle based on the angular velocity around the pitch axis of the human-powered vehicle 1 as detected by the later-described angular velocity sensor 28*e*.

The acceleration sensor 28*d* detects acceleration of the human-powered vehicle 1. The acceleration sensor 28*d* includes, for example, an acceleration sensor to detect acceleration in the propulsive direction of the human-powered vehicle 1. The angular velocity sensor 28*e* includes a gyro sensor that detects angular velocity or angular acceleration around at least one of the yaw axis, the roll axis, and the pitch axis of the human-powered vehicle 1. The detection circuit 22 calculates at least angular velocity, angular acceleration, and the amount of change in the posture position around at least one of the yaw axis, the roll axis, and the pitch axis of the human-powered vehicle 1, using the results of detection of the angular velocity sensor 28*e*.

The term "control unit" as used herein refers to hardware that executes a software program, and does not include a human. The processor 24*a* of the control unit 24 performs arithmetic processing based on the operation input to the shift operating device 14, the results obtained by the detection circuit 22, and information stored in a later-described storage unit 26, to control operation of the transmission 12 based on the arithmetic result. The control unit 24 is, for example, a central processing unit (CPU) or a micro processing unit (MPU) that receives data input, executes instructions, and processes information. The control unit 24 communicates with input/output (I/O) devices, which send and receive data to and from the processor 24*a*.

The storage unit 26 is any computer storage device (computer memory) or any non-transitory computer-readable medium with the sole exception of a transitory, propagating signal. The storage unit 26 includes a cache memory (volatile memory) that transiently stores information transmitted from the control unit 24 and a main memory (non-volatile memory) that persistently stores information preliminarily stored and information transmitted from the control unit 24. Examples of the storage unit 26 include a random access memory (RAM), a read only memory (ROM), a hard disk, a flash drive, etc.

The control unit 24 is configured to transmit, to the transmission 12, a control signal including shift direction information about the shift direction. The shift direction includes an upshift direction to increase the gear ratio of the human-powered vehicle 1 and a downshift direction to reduce the gear ratio of the human-powered vehicle 1. The control unit 24 controls the shift standby time based on at least a piece of information outputted from the detection circuit 22 and the shift direction information.

The control unit 24 transmits a first control signal to the transmission 12, and when the shift standby time has elapsed, transmits a second control signal to the transmission 12. The control unit 24 is configured to transmit a control signal corresponding to a shifting operation input to the shift operating device 14, to the transmission 12. When the shift operating device 14 receives an input of shifting operation twice, the shift operating device 14 transmits a first operation signal and a second operation signal to the control unit 24. Upon receipt of those signals from the shift operating device 14, the control unit 24 transmits the first control signal corresponding to the first operation signal to the transmission 12, and when the shift standby time has elapsed, transmits the second control signal corresponding to the second operation signal to the transmission 12.

In this embodiment, the shift standby time is set in a stepwise manner and includes a first standby time t1 (msec), a second standby time t2 (msec), and a third standby time t3 (msec). The first standby time t1 is longer than both the second standby time t2 and the third standby time t3. The second standby time t2 is longer than the third standby time t3. The shift standby time is not limited to including three steps, and can include two steps or four or more steps. The control unit 24 controls the shift standby time depending on the level of urgency taking account of the traveling state at the timing when the shift operating device 14 receives an operation input. For example, the shift standby time is decreased with an increase in the level of urgency determined based on the traveling state, and is increased with a decrease in the level of urgency. The control unit 24 includes a timer and causes the timer to start upon receipt of an operation signal from the shift operating device 14. The control unit 24 reads the value of the timer and determines whether the shift standby time has elapsed.

Figure 3:
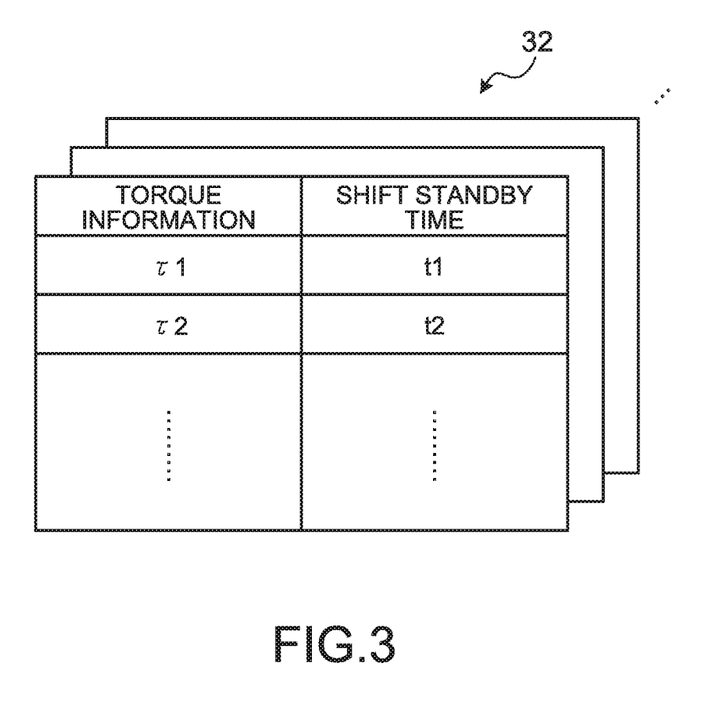
FIG. 3 is a drawing partially illustrating an example of a shift standby time control table.

The storage unit 26 stores therein a shift standby time control table 30. The shift standby time control table 30 is a data table having the traveling state information and the shift standby time associated with each other. As illustrated in FIG. 3, the shift standby time control table 30 includes a plurality of tables 32. Each of the tables 32 stores therein pieces of traveling state information and the shift standby times determined for the respective pieces of traveling state information, in a manner associated with each other.

In FIG. 3, torque information is given as an example of the traveling state information. As illustrated in FIG. 3, pieces of torque information $\tau 1$, $\tau 2$, . . . , and the shift standby times t1, t2, . . . , determined for the respective pieces of torque information, are associated with each other and stored in the table 32. The table 32 includes, although not illustrated, tables that store the traveling state information, including, for example, power information, tilt-angle information, acceleration information, and motion information, and the shift standby time corresponding to the traveling state information in a manner associated with each other.

The control unit 24 controls the shift standby time as described below by referring to, for example, the torque information. The detection circuit 22 determines at least torque information, and the control unit 24 controls the shift standby time by referring to at least the torque information.

When a large torque is input to the human-powered vehicle 1, the human-powered vehicle 1 is assumed to be traveling, for example, on a steep uphill slope. In this situation, since large load for traveling is applied to the rider, the rider is expected to reduce the gear ratio of the human-powered vehicle 1. In other words, the level of urgency for shifting in the downshift direction is high, and the level of urgency for shifting in the upshift direction is low. The control unit 24 thus sets the shift standby time for shifting in the downshift direction to the third standby time t3 and stores the set data in the table 32. The control unit 24 further sets the shift standby time for shifting in the upshift direction to the first standby time t1 and stores the set data in the table 32.

When a small torque is input to the human-powered vehicle 1, the human-powered vehicle 1 is assumed to be traveling, for example, on a steep downhill slope. In this situation, the rider is expected to increase the gear ratio of the human-powered vehicle 1 so as to match the gear ratio to the traveling speed of the human-powered vehicle 1, which has been increased by traveling downhill. In other words, the level of urgency for shifting in the upshift direction is high and the level of urgency for shifting in the downshift direction is low. The control unit 24 thus sets the shift standby time for shifting in the upshift direction to the third standby time t3 and stores the set data in the table 32. The control unit 24 further sets the shift standby time for shifting in the downshift direction to the first standby time t1 and stores the set data in the table 32.

The detection circuit 22 can determine at least power information, and the control unit 24 can control the shift standby time by referring to at least the power information. Even in a case of referring to power, the control unit 24 can also carry out the same control as with the case of referring to torque.

When large power is input to the human-powered vehicle 1, the shift standby time for shifting in the downshift direction is set to the third standby time t3, which is stored in the table 32. Likewise, the shift standby time for shifting in the upshift direction is set to the first standby time t1, which is stored in the table 32. When small power is input to the human-powered vehicle 1, the shift standby time for shifting in the upshift direction is set to the third standby time t3, which is stored in the table 32. Likewise, the shift standby time for shifting in the downshift direction is set to the first standby time t1, which is stored in the table 32.

The detection circuit 22 can determine at least acceleration information, and the control unit 24 can control the shift standby time by referring to the acceleration information. When the acceleration of the human-powered vehicle 1 is suddenly changed, the level of urgency for both shifting in the upshift direction and shifting in the downshift direction is high. The control unit 24 thus sets both the shift standby times in the upshift direction and the downshift direction to the third standby time t3, and stores the set data in the table 32.

The detection circuit 22 can determine at least tilt-angle information, and the control unit 24 can control the shift standby time by referring to the tilt-angle information. The control unit 24 can control the shift standby time by referring to at least a change in the tilt-angle information. A large change in the tilt angle of the human-powered vehicle 1 means that the level of urgency for both shifting in the upshift direction and shifting in the downshift direction is high. The control unit 24 thus sets both the shift standby times in the upshift direction and the downshift direction to the third standby time t3, and stores the set data in the table 32.

The detection circuit 22 can determine at least motion information, and the control unit 24 can control the shift standby time by referring to the motion information. For a large change in the motion information of the human-powered vehicle 1, which is, for a large amount of change in at least one of angular velocity, angular acceleration, and the posture position around at least one of the yaw axis, roll axis, and pitch axis of the human-powered vehicle 1, the level of urgency for both shifting in the upshift direction and shifting in the downshift direction is high. The control unit 24 thus sets both the shift standby times in the upshift direction and the downshift direction to the third standby time t3, and stores the set data in the table 32.

When the human-powered vehicle 1 travels on a flat road, a gentle uphill slope, and a gentle downhill slope, the level of urgency for shifting is neither high nor low. In this situation, the control unit 24 sets both the shift standby times in the upshift direction and the downshift direction to the second standby time t2, and stores the set data in the table 32.

Figure 4:
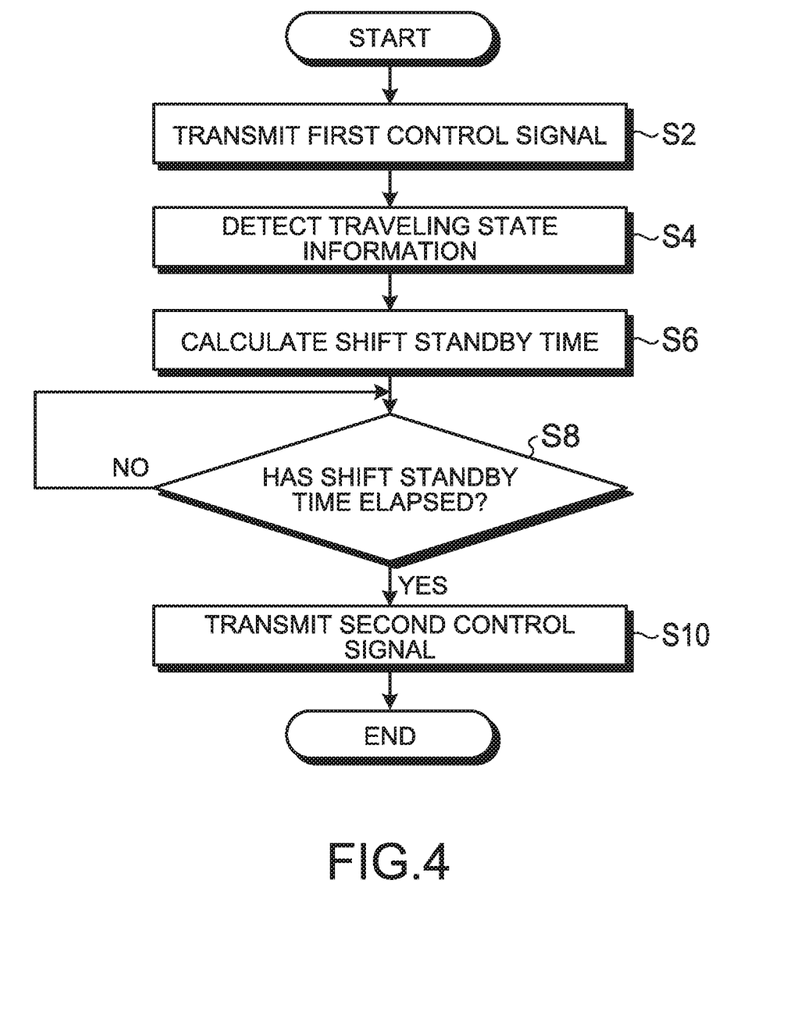
FIG. 4 is a flowchart illustrating an exemplary flow of the control by the gear shift controller.

FIG. 4 is a flowchart of a control flow of the control unit 24. When a first shifting operation and a second shifting operation are input to the shift operating device 14, a first operation signal and a second operation signal are transmitted from the shift operating device 14 to the control unit 24. The control unit 24 receives the first operation signal and the second operation signal from the shift operating device 14 and transmits a first control signal to the transmission 12 (Step S2). At Step S2, the control unit 24 causes the timer to start. The transmission 12 receives the first control signal and changes the gear ratio of the human-powered vehicle 1 based on the first control signal. The control unit 24 acquires the traveling state information from the detection circuit 22 (Step S4). The control unit 24 sets the shift standby time based on the acquired traveling state information (Step S6). At Step S6, the control unit 24 refers to the table 32 of the storage unit 26 and sets the shift standby time corresponding to the acquired traveling state information.

The control unit 24 determines whether the shift standby time has elapsed since transmission of the first control signal at Step S2 (Step S8). At Step S8, the control unit 24 refers to the shift standby time calculated at Step S6 and the value of the timer and determines whether the shift standby time has elapsed. If the control unit 24 determines that the shift standby time has not elapsed (No at Step S8), the control unit 24 repeats the processing of Step S8 until the shift standby time elapses.

If the control unit 24 determines that the shift standby time has elapsed (Yes at Step S8), then the control unit 24 transmits a second control signal to the transmission 12 (Step S10). The transmission 12 receives the second control signal and changes the gear ratio of the human-powered vehicle 1 based on the second control signal.

In this embodiment, as an example, the control unit 24 outputs a control signal based on a shifting operation input to the shift operating device 14; however, the shifting system 10 can include no shift operating devices 14. In this configuration, the control unit 24 automatically outputs a control signal to the transmission 12 based on the traveling speed, cadence, or the like of the human-powered vehicle 1.

Modification

Figure 5:
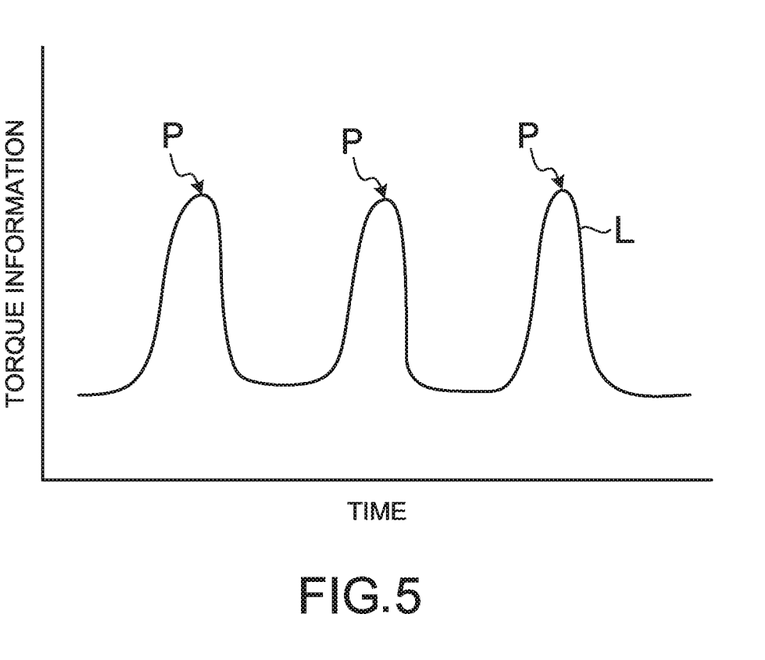
FIG. 5 is a graph indicating an exemplary result of detection of a torque information sensor.

The shift standby time can be measured by counting the number of peaks of torque as illustrated in FIG. 5. In FIG. 5, the abscissa gives time, and the ordinate gives the magnitude of torque. Torque is periodically input to the human-powered vehicle 1 with a rider driving the human-powered vehicle 1. FIG. 5 illustrates output of the torque sensor 28*a* in time series. As illustrated in the graph, a peak P periodically appears on the output. The shift standby time can be defined by the number of peaks P of torque. For example, the shift standby time can be defined as the number of times N in which the peak P of torque is detected (N is a natural number). In this configuration, the control unit 24 refers to the torque information determined by the detection circuit 22. Upon N-th detection of the peak P of torque, the control unit 24 is allowed to transmit the second control signal to the transmission 12.

Second Embodiment

Figure 6:
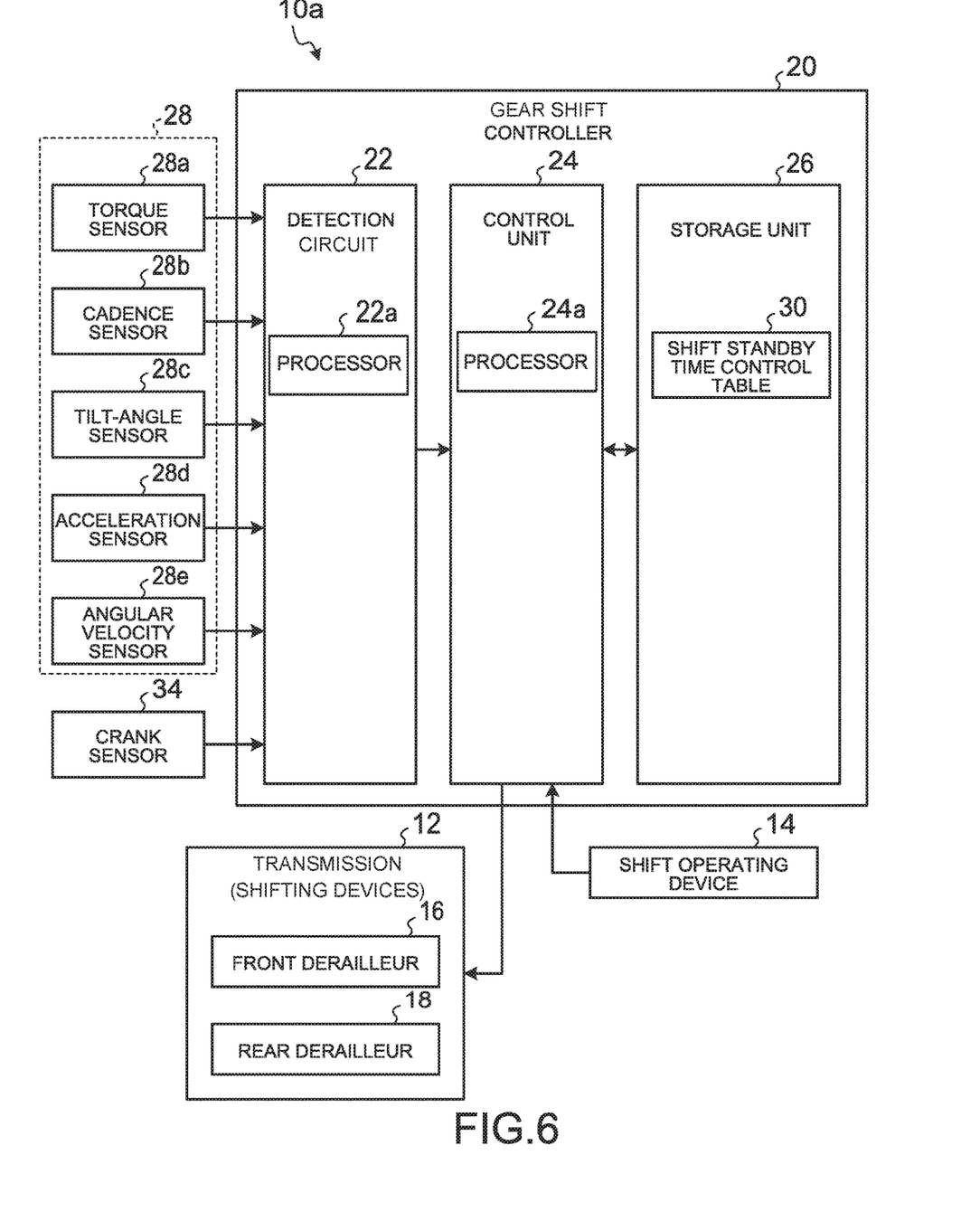
FIG. 6 is a block diagram of a shifting system having the gear shift controller according to a second embodiment.

As illustrated in FIG. 6, the gear shift controller 20 of a shifting system 10a, mounted on the human-powered vehicle 1, is provided with a crank sensor 34. The detection circuit 22 additionally determines crank information from the detection results of the crank sensor 34. The crank information is information about the angle of rotation at which the crank arm CR rotates in the forward direction.

In a case where the shift operating device 14 receives a plurality of inputs of shifting in the upshift direction when the human-powered vehicle 1 travels uphill at a lower gear ratio and then travels downhill, the control unit 24 controls the shift standby time by referring to at least tilt-angle information and crank information. The control unit 24 receives the tilt-angle information from the detection circuit 22 and determines that the human-powered vehicle 1 is traveling uphill or downhill. By referring to the crank information, the control unit 24 can set, as the shift standby time, the time, for example, taken for a rotating crank arm CR to reach a predetermined angle of rotation and store the shift standby time in the table in the storage unit 26. The predetermined angle is 90 degrees or 360 degrees. In this configuration, the control unit 24 is allowed to output a control signal to the transmission 12 every time the crank arm CR rotates the predetermined angle.

The control unit 24 can control the shift standby time by referring to the tilt-angle information, the crank information, and the torque information. In this configuration, the control unit 24 performs the above control when torque input to the human-powered vehicle 1 becomes equal to or lower than a predetermined value.

The control unit 24 can control the shift standby time by referring to the tilt-angle information, the crank information, and the power information. In this configuration, the control unit 24 performs the above control when power input to the human-powered vehicle 1 becomes equal to or lower than a predetermined value.

In the above embodiments, the control unit 24 refers to one or a plurality of pieces of traveling state information to control the shift standby time of the transmission 12. However, the embodiments are not intended to limit any combination of the traveling state information pieces. The control unit 24 can control the shift standby time of the transmission 12 by referring to any combination of the traveling state information pieces, which is different from what has been described in the first embodiment, the modification, and the second embodiment.

While certain embodiment and modification of the present invention have been described, the description thereof is not intended to limit the embodiments. The constituting elements described herein include elements easily achieved by one skilled in the art, elements being substantially the same as the constituting elements, and elements within the scope of equivalents of the constituting elements. The constituting elements described herein can be combined in an appropriate manner. Furthermore, various omissions, substitutions and changes in the constituting elements can be made without departing from the spirit of the embodiment.

The phase "at least one of" as used in this disclosure means "one or more" of a desired choice. For one example, the phrase "at least one of" as used in this disclosure means "only one single choice" or "both the two choices" if the number of its choices is two. For other example, the phrase "at least one of" as used in this disclosure means "only one single choice" or "any combination of equal to or more than two choices" if the number of its choices is equal to or more than three.

What is claimed is:

1. A gear shift controller comprising:
a detection circuit configured to determine traveling state information about a traveling state of a human-powered vehicle; and
a control unit configured to receive the traveling state information from the detection circuit and to control a shift standby time of a transmission of the human-powered vehicle based on the traveling state information,
the traveling state information including information other than traveling speed information about a traveling speed of the human-powered vehicle and crank information about crank rotation information of the human-powered vehicle,
the control unit being configured to transmit a control signal including shift direction information about a shift direction to the transmission, and
the control unit being configured to control the shift standby time based on at least the shift direction and information outputted from the detection circuit.

2. The gear shift controller according to claim 1, wherein the detection circuit determines, as the traveling state information, at least one of:
torque information about torque input to the human-powered vehicle;
power information about power input to the human-powered vehicle;
tilt-angle information about a tilt angle of a road on which the human-powered vehicle travels;
acceleration information about acceleration in a propulsive direction of the human-powered vehicle; and
motion information of the human-powered vehicle about at least one of angular velocity, angular acceleration, and an amount of change in a posture position around at least one of a yaw axis, a roll axis, and a pitch axis, and
the control unit being configured to control the shift standby time based on at least one of the torque information, the power information, the tilt-angle information, the acceleration information and the motion information that is received from the detection circuit.

3. The gear shift controller according to claim 2, wherein the detection circuit is configured to determine at least the torque information, and
the control unit is configured to control the shift standby time based on at least the torque information.

4. The gear shift controller according to claim 2, wherein the detection circuit is configured to determine at least the power information, and
the control unit is configured to control the shift standby time based on at least the power information.

5. The gear shift controller according to claim 2, wherein the detection circuit is configured to determine at least the acceleration information, and the control unit is configured to control the shift standby time based on at least the acceleration information.

6. The gear shift controller according to claim 2, wherein the detection circuit is configured to determine at least the tilt-angle information, and
the control unit is configured to control the shift standby time based on at least the tilt-angle information.

7. The gear shift controller according to claim 6, wherein the control unit is configured to control the shift standby time based on at least a change in the tilt-angle information.

8. The gear shift controller according to claim 2, wherein the detection circuit is configured to determine at least the motion information, and
the control unit is configured to control the shift standby time based on at least the motion information.

9. The gear shift controller according to claim 2, wherein the detection circuit is further configured to determine the crank information, and
the control unit is configured to control the shift standby time based on at least the tilt-angle information and the crank information.

10. The gear shift controller according to claim 9, wherein the control unit is configured to control the shift standby time based on at least the tilt-angle information, the crank information, and the torque information.

11. The gear shift controller according to claim 9, wherein the control unit is configured to control the shift standby time based on at least the tilt-angle information, the crank information, and the power information.

12. The gear shift controller according to claim 1, wherein the control unit is configured to transmit a first control signal to the transmission before the shift standby time has elapsed and transmit a second control signal to the transmission after the shift standby time has elapsed.

13. A shifting system comprising the gear shift controller according to claim 1, and further comprising:
a shifting device of the transmission.

14. The shifting system according to claim 13, further comprising:
a gear shift operating device,
the control signal corresponding to an operation input, and
the gear shift controller being configured to output the control signal to the gear shift operating device.

15. A gear shift controller comprising:
a detection circuit configured to determine traveling state information about a traveling state of a human-powered vehicle; and
a control unit configured to receive the traveling state information from the detection circuit and to control a shift standby time of a transmission of the human-powered vehicle based on the traveling state information,
the traveling state information including information other than traveling speed information about a traveling speed of the human-powered vehicle and crank information about crank rotation information of the human-powered vehicle, and
the shift standby time being a time between transmitting a first control signal to the transmission and transmitting a second control signal to the transmission, the first control signal being based on a first input to a shifting operation device, and the second control signal being based on a second input to the shifting operation device.

16. The gear shift controller according to claim 15, wherein the shift standby time is controlled by selecting the shift standby time from among a plurality of predetermined times.

17. The gear shift controller according to claim 15, wherein the control unit is configured to transmit the first control signal to the transmission before the shift standby time has elapsed and transmit the second control signal to the transmission after the shift standby time has elapsed.

* * * * *